United States Patent Office 3,332,898
Patented July 25, 1967

3,332,898
ALKYD RESINS PREPARED FROM MONOGLYC-
ERIDES OF OLEFINICALLY UNSATURATED
MONOCARBOXYLIC ACIDS AND GLYCIDYL
ESTERS OF SATURATED ALIPHATIC MONO-
CARBOXYL ACIDS AND PROCESS FOR THE
PRODUCTION OF SAME
Nantko Kloos, Amsterdam, Netherlands, assignor to Shell
Oil Company, New York, N.Y., a corporation of
Delaware
No Drawing. Filed Nov. 9, 1961, Ser. No. 151,150
Claims priority, application Netherlands, Nov. 16, 1960,
257,998
4 Claims. (Cl. 260—22)

The invention relates to synthetic resins of the alkyd type and to the production of such resins. More particularly, this invention relates to novel modified alkyd resins having improved properties and to their production.

Specifically, the invention provides a new and valuable polyhydric alcohol-polybasic acid alkyd resin containing ester groups derived from olefinically unsaturated monocarboxylic acids and from saturated aliphatic monocarboxylic acids wherein the carboxyl group is attached to a tertiary or quaternary carbon atom. The invention also provides a process for preparing said alkyl resins.

Alkyd resins are well-known products which are used in paints, lacquers, casting resins, etc. They are prepared by reacting polycarboxylic acids or their anhydrides with polyhydroxy compounds or epoxy compounds. The base materials are so chosen that polyesters are formed of either branched or unbranched structure, while through the presence of reactive groups, such as double bonds or hydroxy groups, curing and cross-linking can be obtained.

Frequently alkyd resins are modified with monocarboxylic acids, as for example, to improve the flexibility. Fatty acids which contain ethylenic double bonds, such as linoleic acid and linolenic acid, are used to obtain air-drying resins. A well-known method of preparation is by first converting highly unsaturated oils with glycerol into monoglycerides, which are then reacted with phthalic anhydride. The unsaturated fatty acids have also been isolated from the oil by saponification or hydrolysis and reacted in the form of their glycidyl esters with phthalic anhydride; see British Patent No. 750,506. Fatty acid mixtures from unsaturated oils often contain also saturated fatty acids, such as palmitic acid or stearic acid. All these fatty acids are composed of unbranched carbon chains carrying a carboxyl group at one end.

It has recently been found that alkyd resins may be prepared by the reaction of polycarboxylic acids or their anhydrides with hydroxyl-group or epoxy-group-containing esters of saturated aliphatic monocarboxylic acids in which the carboxyl group is attached to a tertiary or quaternary carbon atom. The resins thus modified are very suitable base materials for stoving enamels which have improved resistance to chemicals.

The alkyd resins heretofore prepared possess one or more shortcoming which limits their usefulness. Some, for example, do not have adequate recoatability, that is, the first coat ripples, softens or dissolves upon the application of a second or successive coat. Other alkyd resins do not have the desirable resistance to boiling water and chemicals. Still other alkyd resins when used in paints and lacquers produce coatings which are not sufficiently hard for many purposes. And still other alkyd resins discolor very easily and are, therefore, unsuitable where such yellowing is undesirable.

It is therefore an object of the present invention to provide new and useful alkyd resins. It is another object to provide new modified alkyd resins having improved properties. It is another object to provide new and novel alkyd resins which are useful for stoving enamels. It is another object to provide novel air-drying alkyd resins which are particularly suitable for the preparation of air-drying paints and lacquers. It is another object to provide novel alkyd resins which have excellent recoatability and high resistance to yellowing. It is another object to provide alkyd resins which cure under the influence of oxygen or catalysts and are very resistant to chemical action and boiling water. It is a further object to provide novel alkyd resins which are especially suitable as casting resins or in laminates. It is still a further object to provide a process for preparing novel and useful air-drying alkyd resins having improved properties. It is still a further object to provide a process for preparing novel alkyd resins which are particularly suitable for the preparation of air-drying paints and lacquers and as stoving enamels. It is still a further object to provide a process for preparing alkyd resins which are very resistant to chemical action and boiling water, and are especially suitable as casting resins and in laminates. Other objects and advantages of the invention will become apparent to one skilled in the art from the accompanying disclosure and discussion.

It has now been discovered that these and other objects may be accomplished by the novel and useful polyhydric alcohol-polybasic acid alkyd resins containing the ester groups derived from olefinically unsaturated monocarboxylic acids and from saturated aliphatic monocarboxylic acids wherein the carboxyl group is attached to a tertiary or quaternary carbon atom.

Thus, it has now been found that alkyd resins which cure under the influence of oxygen or catalysts, and which are also very resistant to the action of chemicals can be obtained by using as modifying monocarboxylic acids both olefinically unsaturated monocarboxylic acids and saturated aliphatic monocarboxylic acids whose carboxyl group is attached to a tertiary or quaternary carbon atom. The same resin molecule in this case therefore contains both ester groups derived from olefinically unsaturated monocarboxylic acids, and ester groups derived from saturated aliphatic monocarboxylic acids whose carboxyl group is attached to a tertiary or quaternary carbon atom. By a proper choice of the olefinically unsaturdated monocarboxylic acids and using a sufficient quantity thereof, air-drying alkyd resins are obtained. In other cases curing of the resin can be accomplished by oxygen donors, in particular peroxides, or otherwise by other radical-forming materials, as, for example, azoisobutyric nitrile.

The novel air-drying alkyd resins are particularly suitable for the preparation of air-drying paints and lacquers. In general, these resins can also be used as stoving enamels. The lacquers prepared from the novel alkyd resins not only are very resistant to chemicals and to boiling water, but also have excellent recoatability, high resistance to yellowing, and are hard-dry.

The novel alkyd resins are also very suitable for application as casting resin or in laminates where they can, if desired, be applied together with other unsaturated compounds such as styrene.

For the sake of brevity, the saturated aliphatic monocarboxylic acids whose carboxyl group is attached to a tertiary or quaternary carbon atom will, in this specification, further be referred to as branched or alpha-branched monocarboxylic acids.

The novel alkyd resins according to the invention may be prepared in many ways. Preference is given to processes based on esters of the monocarboxylic acids which esters, in the part of the molecule derived from the alcohol, contain at least two free hydroxyl groups or at least one epoxy group. These esters may be reacted with polycarboxylic acids or their anhydrides, under conditions in which further esterification occurs. To promote branching and/or formation of a three-dimensional structure, it may be advisable to take care that part of the compounds involved in the reaction is at least trifunctional, hence, for example, contains three free carboxyl groups or otherwise three or more hydroxyl groups. A good effect in this respect may be obtained by adding glycerol, trimethylolpropane or pentaerythritol. When the functionality of a compound is calculated, the epoxy group is regarded as bifunctional.

These processes can be varied in different ways. Thus, this process may be carried out in different steps. The base materials may be introduced into the mixture to be reacted either in one portion, or gradually or else stepwise. It may be advisable first to react the esters of branched monocarboxylic acids with polycarboxylic acids or their anhydrides, and then to cause the reaction products thus obtained to react with esters of unsaturated monocarboxylic acids. It is, however, also possible first to react the esters of unsaturated monocarboxylic acids with polycarboxylic acids or anhydrides thereof and then to cause the reaction products so obtained to react with esters of branched monocarboxylic acids. In certain cases it is preferable first to react part of the polycarboxylic acids or their anhydrides with esters of unsaturated monocarboxylic acids and, separately, to react another part of the polycarboxylic acids or anhydrides with esters of branched monocarboxylic acids, whereupon the two reaction products obtained separately are combined to achieve further reaction. In the reactions between esters, mentioned in this paragraph, a free polycarboxylic acid or anhydride thereof may be made to co-react if desired. Furthermore, in the various steps, unesterified hydroxy and/or epoxy compounds may also be made to partake in the reaction, in particular, hydroxy and/or epoxy compounds which are at least trifunctional.

The polycarboxylic acids which may be used in the preparation of the novel alkyd resins may be saturated, unsaturated, alicyclic or aromatic and may possess two, three, four or more carboxyl groups. Examples of such acids are malonic, glutaric, succinic, suberic, citric, aconitic, tricarballylic, cyclohexanedicarboxylic, maleic, fumaric, itaconic, citraconic, mesaconic, phthalic, isophthalic, terephthalic, 1,8-naphthalenic, adipic, sebacic, azelaic, pimelic, chlorosuccinic, bromomaleic, dichlorophthalic, dilactic, dihydracrylic benzophenone-2,4'-dicarboxylic acid, trimellitic acid, dimerized fatty acids of drying oils, and Diels-Alder adducts of maleic acid with dienes such as terpenes, cyclopentadiene and hexa-chlorocyclopentadiene.

The preferred polycarboxylic acids to be used in producing the novel alkyd resins are the dicarboxylic acids containing less than 10 carbon atoms, such as succinic acid, glutaric acid, adipic acid, suberic acid, maleic acid, cyclohexanedicarboxylic acid, phthalic acid, diethyl phthalic acid and the like. Particularly preferred polycarboxylic acids are the aromatic dicarboxylic acids containing from 8 to 12 carbon atoms wherein the two carboxyl groups are attached directly to the aromatic ring.

In some cases it may be desirable to utilize other forms of the acid, such as the acid anhydrides or the acid chlorides, as phthalic anhydride, maleic anhydride, succinic chloride and the like.

If desired, two or more of these polycarboxylic acids can be used together. Wherever possible the use of the anhydrides of the polycarboxylic acids is preferred.

The unsaturated monocarboxylic acids include, among others, the fatty acids from drying oils, such as linseed oil, Chinese wood oil, soybean oil, fish oil, cottonseed oil, oiticica oil, perilla oil, sunflower oil, as well as fatty acids from dehydrated castor oil, and tall oil fatty acids. Other unsaturated monocarboxylic acids that may be applied are, for example, acrylic acid and methacrylic acid. These acids are preferably brought in the form of their esters with polyols; such as glycerides, for instance, monoglycerides, diglycerides, or triglycerides, or in the form of epoxy alkyl esters, such as glycidyl esters, to react with the other resin components. Particularly suitable are the aliphatic fatty acids having from 12 to 20 carbon atoms in the molecule.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art. Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

The above-mentioned saturated monocarboxylic acids may be converted into epoxy alkyl esters by any of the known ways for obtaining epoxy esters from monocarboxylic acids. A preferred method for preparing such esters is set forth in a copending application by Nantko Kloos and Jacques J. J. Drost, Ser. No. 28,865, filed May 13, 1960, now U.S. 3,178,454, issued Apr. 13, 1965.

Briefly speaking, a monocarboxylic acid salt (for example alkali metal salts or quaternary ammonium salt) may be reacted with epichlorohydrin. This reaction is preferably carried out by gradually adding a liquid phase consisting of epichlorohydrin or containing the latter in a stream of a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

Monocarboxylic acid may also be reacted as such with epichlorohydrin with the use of nitrogen bases or salts thereof as catalysts. When monocarboxylic acids and epichlorohydrin are used in a stoichiometric ratio, or when an excess of monocarboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

Partial esters of the monocarboxylic acids and polyhydroxy compounds in which the part of the molecule derived from the alcohol contains at least two free hydroxyl groups, can be obtained by heating the monocarboxylic acids with, for example, glycerol, trimethylolpropane or pentaerythritol, preferably in the presence of a catalyst, or otherwise by reacting the monocarboxylic acids with glycidol or other epoxy alcohols.

The mechanical properties of the alkyd resins to be prepared may be further improved by incorporating in the reaction mixture polyhydroxy compounds containing hydroxyl groups linked by chains of 4 to 6 or more atoms. Examples of such poly hydroxy compounds are triethylene glycol, dipropylene glycol and 1,2,6-hexanetriol. In certain cases it may also be useful, for example, to prevent gelation, to incorporate diols with short chains, such as ethylene glycol and propylene glycol, in the reaction mixture.

For the preparation of resins according to the invention one may, for example, react phthalic anhydride, monoglycerides of fatty acids from dehydrated castor oil, glycerol and glycidyl esters of branched monocarboxylic acids, or isophthalic acid, monoglycerides of acids from food oil, pentaerythritol and monoglycerides of branched monocarboxylic acids or else phthalic anhydride, glycidyl esters of acids from linseed oil and glycidyl esters of branched monocarboxylic acids.

The production of the alkyds may be accomplished by any suitable method. They may be prepared, for example, by mixing the polyhydric alcohol, polybasic acid or anhydride and the monocarboxylic acid modifying agents in any order and then heating the resulting mixture or alternatively, by first heating and reacting the polyhydric alcohol with the polybasic acid or anhydride and subsequently adding the monocarboxylic acid modifying agents, or by first heating the alcohol with the modifying agents and then adding the polybasic acid or anhydride.

The resins are preferably prepared by those processes based on esters of the monocarboxylic acids, which esters, in the portion of the molecule derived from the alcohol, contain at least two free hydroxyl groups or at least one epoxy group. Thus, the partial esters of the saturated aliphatic monocarboxylic acids having the carboxyl group attached to a tertiary or quaternary carbon atom with the polyvalent alcohols and the partial esters of the olefinically unsaturated monocarboxylic acids with the polyvalent alcohols are heated with the polycarboxylic acids and/or anhydrides. The epoxy alkyl esters of the modifying monocarboxylic acids may be used in lieu of part or all of the partial esters with the polyvalent alcohols. Ordinarily no catalyst need be employed to effect this reaction, but if desired, catalysts usually employed in esterification reactions may be used, such as p-toluenesulfonic acid, zinc chloride, stannic chloride, calcium acetate, barium acetate, zinc acetate, hydrochloric acid, litharge, etc., in amounts preferably varying from 0.1% to 5% by weight of the reactants may be employed.

The proportions in which the polyhydric alcohol and polybasic acid or aldehyde are combined will vary over a considerable range. Ordinarily the polyhydric alcohol and polybasic acid or aldehyde will be employed, in equimolar amounts, but satisfactory results are obtained when there is up to 30 mole percent excess of either reactant. Preferably, the polybasic acid or derivative is reacted with an equimolar to 25 mole percent excess of the polyhydric alcohol.

The amount oft he monocarboxylic acid modifying agents to be utilized will vary over a considerable range depending upon the type of product desired. The total amount of the monocarboxylic acid modifying agents will generally vary from 30% to 80% by weight of the resulting alkyd resin, with a preferred range varying from 40% to 60% by weight of said resin. Higher or lower amounts may be employed, however, if desired or necessary. These monocarboxylic acid modifying agents are made up of from 20% to 90% of olefinically unsaturated monocarboxylic acids and from 10% to 80%, based on the total amount of modifying agents, of saturated aliphatic monocarboxylic acids in which the carboxyl group is attached to a tertiary or quaternary carbon atom. From 10% to 50% of saturated aliphatic monocarboxylic acids branched in the alpha position is preferred.

The temperature employed during the resin forming reaction may vary over a considerable range depending upon the type of reactants, catalysts, etc. In most cases the temperature will range between 130° and 20° C. If water forms during the reaction, a temperature between 190° C. and 240° C. is preferably maintained.

The resin-forming reaction may be accomplished in the presence or absence of solvents or diluents. If solvents or diluents are employed, it is desirable to utilize inert organic compounds, such as benzene, toluene, xylene, cyclohexanone, chloroform, carbon tetrachloride, and the like.

It is preferred in most cases to accomplish the resin-forming reaction under a blanket of an inert gas, at least during the initial stages of the reaction. By an inert gas is meant one substantially devoid of oxygen, such as nitrogen, carbon dioxide, and the like. Atmospheric, superatmospheric, or subatmospheric pressures may be used.

The water formed during the reaction may be removed during the said reaction or at its completion. It is preferably removed susbtantially as fast as it is formed therein. The removal of the water may be accomplished by any suitable means, such as distillation and the like.

The novel resins produced according to the invention are light in color.

The novel resins produced according to the invention can be processed to paints, lacquers and varnishes in the usual way by applying conventional additives such as pigments, solvents, siccatives and thickening agents.

Drying or curing of these paints, lacquers and varnishes can generally take place at normal temperature. In certain cases it is desirable to apply elevated temperatures, for exmple, 100–150° C. Drying of air-drying paints can be accelerated by the presence of metal compounds, such as salts of cobalt, manganese and lead, in particular, salts of organic acids. Curing agents which do not require the presence of gaseous oxygen for the curing action may also be used. In general, various polymerization catalysts may serve as curing agents. It is preferable to add as catalysts compounds producing free radicals, for example, peroxides and hydroperoxides, such as benzoyl peroxide, ditertiary butyl peroxide, dicumyl peroxide and cumyl hydroperoxide. Also, other radical-producing compounds are suitable, for example, azoisobutyronitrile.

Surh polymerization catalysts are of particular importance where the novel alkyd resins are used as casting resins or in laminates. In some cases also other polymerization catalysts can be applied for this purpose, such as Friedel-Crafts catalysts. The quantities used of the various catalysts generally are between 0.001 and 5% by weight, calculated on the alkyd resin. Of the siccatives or driers preferably 0.01 to 1% by weight is added, calculated on the alkyd resin.

For application in casting resins and laminates the use of a co-polymerizing solvent is advantageous. Styrene for example is very suitable to this end. Thus, one part of a resin according to the invention may be mixed with ½ to 2 parts of styrene and 0.002 to 0.05 part of benzoyl peroxide. Such mixtures cure within a few hours if kept at temperatures between 75 and 120° C.

To illustrate the manner in which the invention will be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

Some of the test methods for evaluating the novel modified alkyl resins of the present invention are described as follows:

A paint or lacquer coating is called cotton-free if fibers no longer adhere to it when a piece of cotton wool 2–3 cm. in size is dropped from a height of 20 cm. onto the horizontally-placed coating and blown away after 10 sec.

A paint or lacquer coating is called hard-dry if it is no longer damaged by twisting it with the thumb. To carry out the test a panel with a paint coating is placed horizontally on a scale, the other pan is loaded by a 7 kg. weight and equilibrium is established by pressing with the thumb upon the paint coating. Then the thumb is twisted through 90 degrees.

The recoatability was evaluated by applying a second paint coat on top of the first after 18 hours. The first coat shall not ripple, dissolve or soften.

The resistance to boiling water was rated by immersing a metal panel, which had been coated with a lacquer and then dried for 3 days in the air, for 15 minutes into boiling water. The clearness of the lacquer coating was rated immediately afterwards, and again after 15 minutes.

The resistance to chemicals was evaluated by exposing a metal panel, coated with a lacquer and dried for 2 weeks in the air, to the action of a 5% solution of trisodium phosphate or of 5% sulfuric acid for 3 days. The rating 0 indicates a completely destroyed coat, the rating 10, no attack. The test panels used for assessing the resistance to sodium hydroxide had been dried in the air for 4 weeks.

Yellowing was rated by exposing 3 days after its application, a paint pigmented with 0.8 part of titanium white per 1 part of resin, for 2 hours to a temperature of 100° C.

The monocarboxylic acids branched at the alpha position were obtained by reacting olefins, containing from 8 to 10 carbon atoms per molecule, with carbon monoxide and water in the presence of a catalyst composed of phosphoric acid, boron trifluoride and water. They contain from 9 to 11 carbon atoms per molecule and the carboxyl group is attached to a tertiary and/or quaternary carbon atom. The sodium salts thereof were converted into glycidyl esters by means of epichlorohydrin.

*Example I*

A mixture of:

| | G. |
|---|---|
| Phthalic anhydride | 148 |
| Glycidyl esters of monocarboxylic acids branched at the alpha-position | 81 |
| Monoglycerides of fatty acids from dehydrated castor oil | 248 |
| Xylene | 15 | was kept at 220° C. for 4 hours in a nitrogen atmosphere with stirring. The water formed was removed continuously by azetropic distillation. The resin thus obtained had an acid value of 11 and, in a 40% solution in white spirit containing 45% of aromatics, a viscosity of 207 cs.

An air-drying varnish was prepared from the above-mentioned solution in white spirit by adding 0.1% of cobalt naphthenate, 0.02% of lead naphthenate and 0.05% of manganese naphthenate as drier (calculated on the alkyd resin).

This varnish was applied to thin steel panels and yielded a colorless completely transparent lacquer coat with the following properties:

| | |
|---|---|
| Cotton-free hours | After 3½ |
| Hard-dry do | Within 24 |
| Recoatability | Excellent |
| Resistance to boiling water | Excellent |
| Resistance to $Na_3PO_4$ | 10 |
| Resistance to $H_2SO_4$ | 10 |

Yellowing of a paint pigmented with titanium white was hardly visible.

*Example II*

A mixture of:

| | G. |
|---|---|
| Phthalic anhydride | 148 |
| Glycidyl esters of monocarboxylic acids branched at the alpha-position (as in Example I) | 104.5 |
| Monoglycerides of linseed oil fatty acids | 160 |
| Glycerol | 11 |
| Xylene | 13 | was kept at 220° C. for 4 hours in a nitrogen atmosphere, with stirring. The water formed was removed continuously. The resin thus obtained had an acid value of 10 and, in a 50% solution in low aromatic white spirit, a viscosity of 237 cs.

By adding the drier described in Example I an air-drying varnish was prepared from the solution in white spirit, which, when applied to thin steel panels, yielded a colorless, completely clear lacquer coat with the following properties:

| | |
|---|---|
| Cotton-free | In 60 minutes. |
| Hard-dry | Within 24 hours. |
| Recoatability | Excellent. |
| Resistance to boiling water | Excellent. |
| Resistance to $Na_3PO_4$ | 10. |
| Resistance to NaOH (3%) | After 2 days, only very slight attack and no discoloration. |

Yellowing of a paint pigmented with titanium white was hardly visible.

I claim as my invention:

1. A polyhydric alcohol-polybasic acid alkyd resin resulting from the reaction of (1) phthalic anhydride, (2) a monoglyceride of an olefinically unsaturated aliphatic monocarboxylic acid of from 12 to 20 carbon atoms per molecule and (3) a glycidyl ester of an alpha-branched saturated aliphatic monocarboxylic acid, said acid containing from 9 to 19 carbon atoms per molecule and prepared by reacting an alkene with carbon monoxide and water in the presence of an acid catalyst.

2. A polyhydric alcohol-polybasic acid alkyd resin resulting from the reaction of (1) phthalic anhydride, (2) monoglycerides of fatty acids from dehydrated castor oil and (3) glycidyl esters of mixed alpha-branched saturated aliphatic monocarboxylic acids, said acids containing from 9 to 11 carbon atoms per molecule and prepared by reacting an alkene with carbon monoxide and water in the presence of an acid catalyst.

3. A process for preparing alkyd resins which comprises admixing and reacting in a single step (1) phthalic anhydride, (2) a monoglyceride of an olefinically unsaturated aliphatic monocarboxylic acid of from 12 to 20 carbon atoms per molecule and (3) a glycidyl ester of an alpha-branched sautrated aliphatic monocarboxylic acid, said acid containing from 9 to 19 carbon atoms per molecule and prepared by reacting an alkene with carbon monoxide and water in the presence of an acid catalyst, then maintaining the mixture in the presence of an inert organic solvent at a temperature between 190° and 240° C. while maintaining a blanket of inert gas and removing water during the reaction at the rate at which it is formed.

4. A process for preparing alkyd resins which comprises admixing and reacting in a single step (1) phthalic anhydride, (2) a monoglyceride of an olefinically unsaturated aliphatic monocraboxylic acid selected from the group consisting of fatty acids from linseed oil, fatty acids from dehydrated castor oil, tall oil fatty acids and mixtures thereof, and (3) glycidyl esters of mixed alpha-branched saturated aliphatic monocarboxylic acids, said acids containing from 9 to 11 carbon atoms per molecule and prepared by reacting alkenes with carbon monoxide and water in the presence of an acid catalyst, then maintaining the mixture in the presence of an inert organic solvent at a temperature between 190° and 240° C. while maintaining a blanket of inert gas and removing water during the reaction at the rate at which it is formed.

References Cited

UNITED STATES PATENTS

| 2,606,890 | 8/1952 | Polly et al. | 260—410 |
| 2,783,270 | 2/1957 | Polly et al. | 260—410.7 |
| 2,876,241 | 3/1959 | Koch et al. | 260—413 |
| 2,911,422 | 11/1959 | Ercoli | 260—413 |

(Other references on following page)

UNITED STATES PATENTS

| | | | |
|---|---|---|---|
| 2,919,253 | 12/1959 | Hart | 260—22 |
| 2,966,479 | 12/1960 | Fischer | 260—98.4 |
| 2,973,331 | 2/1961 | Kraft | 260—76 |
| 3,039,979 | 6/1962 | Carlick et al. | 260—76 |
| 3,049,506 | 8/1962 | Kibler et al. | 260—76 |
| 3,050,480 | 8/1962 | Budde | 260—22 |
| 3,142,686 | 7/1964 | Kreps et al. | 260—22 |
| 3,064,040 | 11/1962 | Klemchuk | 260—413 |

OTHER REFERENCES

"Organic Coating Technology" (Payne), vol. 1, John Wiley & Sons, Inc., copyright 1954, pages 290–293 relied on. (Copy in Scientific Library.)

DONALD E. CZAJA, *Primary Examiner*.

LEON J. BERCOVITZ, A. D. SULLIVAN, *Examiners*.

R. W. GRIFFIN, *Assistant Examiner*.